C. F. MEGOW.
ATTACHMENT FOR TRACTORS.
APPLICATION FILED APR. 8, 1916.

1,215,687.

Patented Feb. 13, 1917.

Witnesses

Inventor
Charles F. Megow,
By
Attorneys

UNITED STATES PATENT OFFICE.

CHARLES F. MEGOW, OF DETROIT, MICHIGAN.

ATTACHMENT FOR TRACTORS.

1,215,687.   Specification of Letters Patent.   Patented Feb. 13, 1917.

Application filed April 8, 1916. Serial No. 89,749.

*To all whom it may concern:*

Be it known that I, CHARLES F. MEGOW, a citizen of the United States of America, residing at Detroit, in the county of Wayne and State of Michigan, have invented certain new and useful Improvements in Attachments for Tractors, of which the following is a specification, reference being had therein to the accompanying drawings.

This invention relates to a tractor attachment, and more particularly to certain improvements whereby the attachment to be hereinafter described may be used in connection with a tractor provided with two speed wheels as disclosed in my Patent No. 1,169,852, granted February 1, 1916.

The present invention aims to provide an attachment for a tractor or similar vehicle which will permit of the power plant of the tractor being used for other purposes than that of propelling the tractor, and this is accomplished by bracing the rear end of the tractor and providing the rear driven axle with pulleys or power transmitting means.

My invention further aims to provide a tractor attachment that may be easily and quickly installed, and other features of my invention will appear as the nature of the attachment is better understood.

Reference will now be had to the drawing, wherein—

Figure 1:
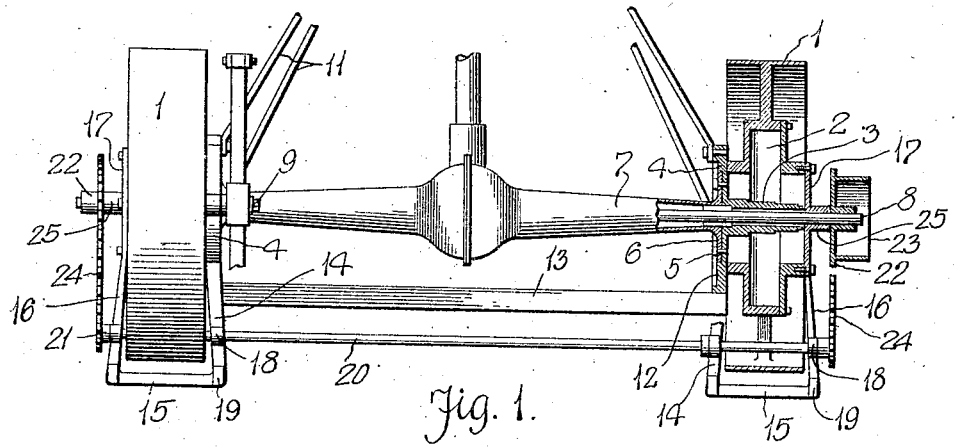
Figure 1 is a plan of a portion of the tractor provided with the attachment and partly broken away and partly in section.
Figure 2:
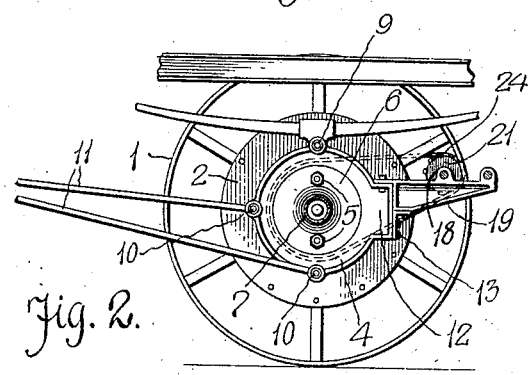
Fig. 2 is a side elevation of the tractor attachment.

In the drawing, 1 denotes tractor wheels having large hollow hub members 2 adapted to accommodate the two speed mechanism inclosed in my Patent No. 1,169,852 above mentioned. Axially of the hub members 2 are stepped sleeves 3 having circular heads 4 connected, as at 5, to the end flanges 6 of a rear axle casing or housing 7. The rear axle casing or housing 7 contains a rear driven axle 8 which extends through the sleeve 3 of the wheel 1, said axle and the casing or housing thereof being of a conventional form such as used in connection with many types of tractors.

The heads 4 are provided with spring perches 9 and connections 10 for radius or truss rods 11. The heads 4 are also formed with rear projections 12 connected by a transverse angle bar 13, which braces one side of the attachment relative to the other. Connected to the projections 12 and the ends of the angle bar 13 are the inner arms 14 of horizontally disposed yokes 15, said yokes having the outer arms 16 thereof provided with heads 17 bolted or otherwise connected to the hub members 2 of the wheels 1. The yokes 15 are provided with sets of bearings 18 and 19, the former accommodating a shaft 20 that extends between the spokes of the wheels 1. This shaft 20 may be journaled outside of the wheels 1 in the bearings 19 of the yoke 15.

Mounted upon the ends of the shaft 20 are sprocket wheels 21 longitudinally alining the large sprocket wheel 22 forming part of pulleys or drums 23 mounted upon the outer ends of the axle 8. Trained over the sprocket wheels 21 and 22 are sprocket chains 24, said sprocket wheels and chains constituting a conventional transmission mechanism whereby the ends of the driven axle 8 may be revolved in synchronism.

The combined sprocket wheels and pulleys abut bearings 25 forming part of the heads 17 of the yoke 15, and the ends of the axle 8 are journaled in said bearings, as best shown in Fig. 1. In consequence of this construction and arrangement, the ends of the axle 8, which are operated through the medium of a differential mechanism, are driven in synchronism and by using a belt in conjunction with the pulley 23 power may be derived from the tractor for operating various kinds of machinery.

Figure 3:
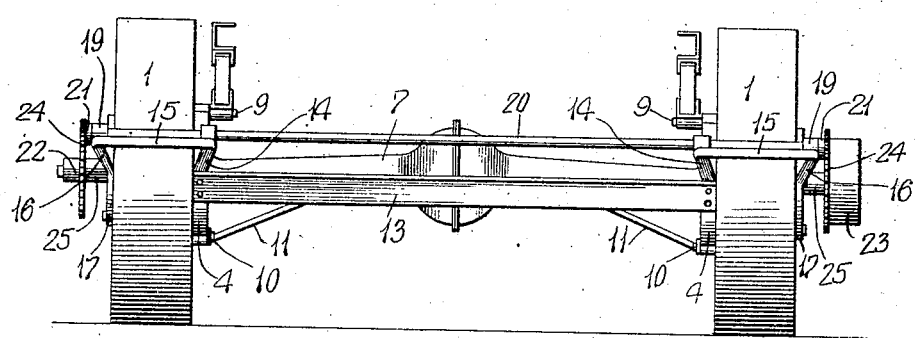
Fig. 3 is a rear elevation of the same.

As illustrated in Figs. 1 and 3, an ordinary sprocket wheel may be mounted upon one end of the axle 8 while a combined sprocket wheel and pulley is mounted upon the opposite end of the axle, although in some instance power may be derived from both ends of the axle.

It is thought that the utility of my tractor attachment will be apparent without any further description, and while in the drawing there is illustrated a preferred embodiment of the invention, it is to be understood that the structural elements are susceptible to such variations and modifications as fall within the scope of the appended claims.

What I claim is:—

1. The combination with a tractor having wheels, a rear driven axle, and an axle casing, of heads connected to said axle casing, yokes connected to said heads, heads carried by said yokes and connected to the outer sides of said wheels, a transverse shaft carried by said yokes, a power transmission mechanism between the ends of said shaft and the ends of said axle, and means whereby power may be derived from either end of said axle.

2. The combination with a tractor having wheels, a rear driven axle, and an axle casing, of yokes connecting the outer sides of said wheels to the ends of said axle casing, a power transmission mechanism supported by said yokes whereby the ends of said axle may be driven in synchronism, and means whereby power may be derived from an end of said axle.

3. The combination with a tractor having wheels, a rear driven axle, and an axle casing, of heads connected to said axle casing, a brace connecting said heads, yokes connected to said heads and the outer sides of said wheels, a shaft carried by said yokes, a power transmission mechanism between the ends of said shaft and the ends of said axle, means whereby power may be derived from the end of said axle.

4. A tractor attachment comprising yokes adapted to connect the outer sides of tractor wheels to an axle casing, a shaft supported by said yokes and adapted to extend between the spokes of tractor wheels, and a power transmission mechanism at each end of said shaft whereby the ends of an axle may be driven in synchronism.

In testimony whereof I affix my signature in presence of two witnesses.

CHARLES F. MEGOW.

Witnesses:
KARL H. BUTLER,
G. E. McGRANN.

Copies of this patent may be obtained for five cents each, by addressing the "Commissioner of Patents, Washington, D. C."